United States Patent

Saeki et al.

[11] Patent Number: 6,031,132
[45] Date of Patent: Feb. 29, 2000

[54] AMIDE-GROUP-CONTAINING POLYACETAL AND ITS PRODUCTION PROCESS AND USE

[75] Inventors: Takuya Saeki, Suita; Hideyuki Nishibayashi, Kobe; Shigeru Yamaguchi, Yao; Satoru Miura, Ibaraki, all of Japan

[73] Assignee: Nippon Shokubai Co., Ltd., Osaka, Japan

[21] Appl. No.: 09/211,919

[22] Filed: Dec. 15, 1998

[30] Foreign Application Priority Data

Dec. 18, 1997 [JP] Japan .................... 9-349707

[51] Int. Cl.⁷ ............................ C11D 3/37; C08G 2/38; C08G 4/00; C07C 235/74

[52] U.S. Cl. .................. 564/153; 510/337; 510/360; 510/434; 510/475; 510/476; 510/480; 525/398; 528/230; 528/232; 528/243; 528/245; 562/564; 562/565; 564/136

[58] Field of Search .................... 510/337, 360, 510/434, 475, 476, 480; 525/398; 528/230, 232, 243, 245; 562/564, 565; 564/136, 153

[56] References Cited

U.S. PATENT DOCUMENTS

| | | | |
|---|---|---|---|
| 4,140,676 | 2/1979 | Crutchfield et al. | 528/231 |
| 4,144,226 | 3/1979 | Crutchfield et al. | 528/231 |
| 4,146,495 | 3/1979 | Crutchfield et al. | 252/89 R |
| 4,201,858 | 5/1980 | Crutchfield et al. | 528/232 |
| 4,204,052 | 5/1980 | Crutchfield et al. | 525/398 |
| 4,224,420 | 9/1980 | Papanu et al. | 525/401 |
| 4,225,685 | 9/1980 | Dyroff et al. | 525/401 |
| 4,226,959 | 10/1980 | Dyroff et al. | 525/401 |
| 4,226,960 | 10/1980 | Dyroff et al. | 525/401 |
| 4,233,422 | 11/1980 | Dyroff et al. | 525/398 |
| 4,233,423 | 11/1980 | Dyroff et al. | 525/398 |
| 4,302,564 | 11/1981 | Dyroff et al. | 525/398 |
| 4,303,777 | 12/1981 | Crutchfield et al. | 525/398 |
| 4,315,092 | 2/1982 | Crutchfield et al. | 528/230 |
| 4,436,933 | 3/1984 | Diery | 562/470 |
| 4,542,206 | 9/1985 | Dyroff | 528/480 |
| 4,600,750 | 7/1986 | Dyroff et al. | 525/390 |
| 5,856,288 | 1/1999 | Saeki et al. | 510/360 |

FOREIGN PATENT DOCUMENTS

| | | |
|---|---|---|
| 0 001 004 | 3/1979 | European Pat. Off. . |
| 0 112 738 | 7/1984 | European Pat. Off. . |
| 0 384 911 | 8/1990 | European Pat. Off. . |
| 0 803 521 | 10/1997 | European Pat. Off. . |
| 31 36 025 | 3/1983 | Germany . |
| 41 06 355 | 9/1992 | Germany . |
| 54-52196 | 4/1979 | Japan . |
| 10-53648 | 2/1998 | Japan . |

*Primary Examiner*—Peter O'Sullivan

[57] ABSTRACT

An amide-group-containing polyacetal, having acetal structure unit (1) of general formula (1) below in its molecule. This amide-group-containing polyacetal is usable as a detergent builder for detergent compositions.

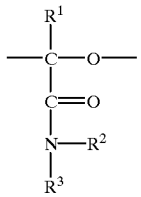

(1)

A production process of an amide-group-containing polyacetal, comprising the step of carrying out an ester-amide exchange reaction between an ester-group-containing polyacetal having acetal structure unit (3) of general formula (3) below in its molecule and an amine.

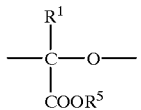

(3)

23 Claims, 2 Drawing Sheets

AMIDE-GROUP-CONTAINING POLYACETAL AND ITS PRODUCTION PROCESS AND USE

DESCRIPTION

Amide-Group-Containing Polyacetal and Its Production Process and Use

TECHNICAL FIELD

The present invention relates to: an amide-group-containing polyacetal which has biodegradability and displays hydrolysisproofness and detergency at high levels; a production process of the amide-group-containing polyacetal; and uses of the amide-group-containing polyacetal.

BACKGROUND ART

Conventionally, various polymers are used in fields of plastic and so on by utilizing their functions. However, in the present condition, only a few of them have a degradation under natural environment (biodegradability).

It is known that, among those polymers, polyacetals with a substituent, such as carboxylic ester group, directly linking to their main chains, have excellent biodegradability (JP-A-54-052196 and EP 0384911A2). However, a polyacetal with the carboxylic ester group has problems in that it is unstable to acids or alkalis and therefore easily hydrolyzes.

In addition, a polyacetal with a carboxylic salt group directly linking to its main chain is recently used as a detergent builder, but it is desired to further enhance the detergency of this polyacetal.

DISCLOSURE OF THE INVENTION

Object of the Invention

Therefore, it is an object of the present invention to provide: a novel amide-group-containing polyacetal and its uses, wherein the polyacetal has biodegradability and displays hydrolysisproofness and detergency at high levels; and a production process to easily give this polyacetal.

SUMMARY OF THE INVENTION

To solve the above problems, the present inventors tried to convert a substituent, directly linking to the main chain of the polyacetal, into various groups. As a result, the inventors found that the conversion into an amide group would enhance the hydrolysisproofness of the polyacetal. Furthermore, the inventors diligently studied about uses of such a polyacetal with a converted amide group, and as a result, found that such a polyacetal would be usable as a detergent builder which displays high detergency of mud dirt as a matter of course, and further of oil dirt. Thus, the present invention has been completed.

That is to say, an amide-group-containing polyacetal, according to the present invention, has acetal structure unit (1) of general formula (1) below in its molecule, wherein general formula (1) is

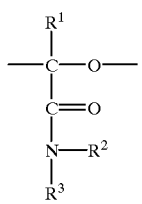

(1)

wherein $R^1$ denotes at least one member selected from the group consisting of a hydrogen atom, a methyl group, an ethyl group, and a halogen atom; $R^2$ and $R^3$ are both at least one member selected from the group consisting of a hydrogen atom, alkyl groups with 1 to 18 carbon atoms, alkenyl groups with 2 to 18 carbon atoms, aromatic groups having at least one benzene ring, alkoxy groups (2) of general formula (2) below, and substituted alkyl groups (4) of general formula (4) below, and may be the same as each other at the same time or different from each other, wherein the alkyl groups, the alkenyl groups, and the benzene ring all may contain a substituent;

and wherein general formula (2) is

(2)

wherein: $R^4$ denotes at least one member selected from the group consisting of a hydrogen atom, alkyl groups, and aromatic groups having at least one benzene ring; m is 2 to 4; and l is 1 or more;

and wherein general formula (4) is

(4)

wherein: A denotes at least one member selected from the group consisting of $SO_3H$, $SO_3Na$, SH and $NR^6R^7$, wherein $R^6$ and $R^7$ are both at least one member selected from the group consisting of a hydrogen atom, alkyl groups with 1 to 18 carbon atoms, alkenyl groups with 2 to 18 carbon atoms, and aromatic groups having at least one benzene ring, and may be the same as each other at the same time or different from each other, wherein the alkyl groups, the alkenyl groups, and the benzene ring all may contain a substituent; and n is 1 to 4.

It is preferable that the above amide-group-containing polyacetal, according to the present invention, further has glyoxylic salt structure unit (5) of general formula (5) below in its molecule, wherein general formula (5) is

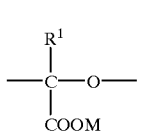

(5)

wherein: $R^1$ denotes at least one member selected from the group consisting of a hydrogen atom, a methyl group, an ethyl group, and a halogen atom; and M denotes at least one member selected from the group consisting of alkaline metals, alkaline earth metals, an ammonium group, and organic amine groups.

As to the amide-group-containing polyacetal according to the present invention, it is preferable that $R^2$ and $R^3$ in general formula (1) are both at least one member selected from the group consisting of a hydrogen atom, alkyl groups with 1 to 18 carbon atoms, aromatic groups having at least one benzene ring, and substituted alkyl groups (4).

As to the amide-group-containing polyacetal according to the present invention, it is preferable that A in general formula (4) is at least one member selected from the group consisting of $SO_3H$, $SO_3Na$, and SH.

As to the amide-group-containing polyacetal according to the present invention, it is preferable that at least one of $R^2$ and $R^3$ in general formula (1) is at least one member selected from the group consisting of long-chain alkyl groups with 6 to 18 carbon atoms, a phenyl group, and a naphthyl group, and further that the ratio of acetal structure unit (1) is in the range of 0.1~70 weight % of the whole amide-groupcontaining polyacetal, and still further that the weight-average molecular weight is in the range of 500~500,000.

A production process of an amide-group-containing polyacetal, according to the present invention, comprises the step of carrying out an ester-amide exchange reaction between an ester-group-containing polyacetal having acetal structure unit (3) of general formula (3) below in its molecule and an amine, wherein general formula (3) is

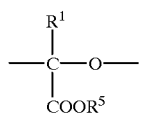

(3)

wherein: $R^1$ denotes at least one member selected from the group consisting of a hydrogen atom, a methyl group, an ethyl group, and a halogen atom; and $R^5$ denotes an alkyl group with 1 to 4 carbon atoms.

As to the above production process according to the present invention, it is preferable that a part of the ester groups are converted into amide groups and that the residual ester groups are hydrolyzed.

A detergent builder, according to the present invention, comprises the above amide-group-containing polyacetal according to the present invention.

A detergent composition, according to the present invention, comprises a surfactant and the above amide-group-containing polyacetal according to the present invention.

Detailed Description of the Invention
(Amide-Group-Containing Polyacetal):

The amide-group-containing polyacetal, according to the present invention, has acetal structure unit (1) in its molecule. This polyacetal has biodegradability, and further, because of amide group in acetal structure unit (1), has high hydrolysisproofness and detergency. This polyacetal might be soluble in various organic solvents or water according to the kinds of the below-mentioned groups, such as $R^2$ and $R^3$, in acetal structure unit (1) or according to the kinds of the below-mentioned other structure units.

Acetal structure unit (1) is shown by the above general formula (1) and has a structure derived from amide glyoxylates or its derivatives.

$R^1$ in general formula (1) denotes at least one member selected from the group consisting of a hydrogen atom, a methyl group, an ethyl group, and a halogen atom. Examples of the halogen atom include: fluorine, chlorine, bromine, and iodine. These halogen atoms can exist alone respectively or coexist with each other. Among these $R^1$s, the hydrogen atom is preferable because of its easiness of production.

$R^2$ and $R^3$ in general formula (1) are both at least one member selected from the group consisting of a hydrogen atom, alkyl groups with 1 to 18 carbon atoms, alkenyl groups with 2 to 18 carbon atoms, aromatic groups having at least one benzene ring, alkoxy groups (2), and substituted alkyl groups (4), and may be the same as each other at the same time or different from each other.

Examples of the alkyl group with 1 to 18 carbon atoms include: methyl, ethyl, propyl, butyl, hexyl, dodecyl, stearyl, isobutyl, tert-butyl, and neopentyl. These groups can exist alone respectively or coexist with each other. The above alkyl group may have a substituent.

Examples of the alkenyl group with 2 to 18 carbon atoms include: ethenyl, propenyl, butenyl, an isobutylene group, allyl, isopropenyl, dodecanyl, and octadecanyl. These groups can exist alone respectively or coexist with each other. The above alkenyl group may have a substituent.

The aromatic groups having at least one benzene ring are groups as derived from aromatic compounds having at least one benzene ring, and examples thereof include phenyl, benzyl, naphthyl, biphenyl, fluorenyl, phenanthrenyl, anthracenyl, and naphthizyl. These groups can exist alone respectively or coexist with each other. The above benzene ring may have a substituent.

Alkoxy group (2) is shown by the above general formula (2). $R^4$ in alkoxy group (2) denotes at least one member selected from the group consisting of a hydrogen atom, alkyl groups, and aromatic groups having at least one benzene ring. Examples of $R^4$ include: a hydrogen atom; alkyl groups such as methyl, ethyl, propyl, and butyl; aromatic groups having at least one benzene ring, such as benzyl and naphthyl. These groups can exist alone respectively or coexist with each other. It is preferable that $R^4$ is at least one member selected from the group consisting of a hydrogen atom, a methyl group, an ethyl group, a benzyl group, and a naphthyl group, because these atom and groups facilitate the production.

Incidentally, in general formula (2), m is 2 to 4, and l is 1 or more, preferably 1 to 200. It might be difficult to obtain an amide-group-containing polyacetal with l exceeding 200.

Substituted alkyl group (4) is shown by the above general formula (4). "A" in substituted alkyl group (4) denotes at least one member selected from the group consisting of $SO_3H$, $SO_3Na$, SH and $NR^6R^7$. $R^6$ and $R^7$ are both at least one member selected from the group consisting of a hydrogen atom, alkyl groups with 1 to 18 carbon atoms, alkenyl groups with 2 to 18 carbon atoms, and aromatic groups having at least one benzene ring, and may be the same as each other at the same time or different from each other. The alkyl groups, the alkenyl groups, and the benzene ring all may contain a substituent. In addition, n is 1 to 4.

If A in substituted alkyl group (4) is at least one member selected from the group consisting of $SO_3H$ and $SO_3Na$, high gelation resistance is displayed when the amide-group-containing polyacetal is used as a water-soluble polymer. In addition, if A is SH, the chelating force to heavy metals appears. If $R^6$ and $R^7$ are at least one member selected from the group consisting of a hydrogen atom, a methyl group, and an ethyl group, then the cationic nature appears, and the flocculation ability increases.

It is preferable that $R^2$ and $R^3$ are both at least one member selected from the group consisting of a hydrogen atom, alkyl groups with 1 to 18 carbon atoms, aromatic groups having at least one benzene ring, and substituted alkyl groups (4) among the examples of $R^2$ and $R^3$ as explained above. If $R^2$ and $R^3$ are at least one member selected from the group consisting of a hydrogen atom, a methyl group, and an ethyl group, then the water-solubility appears. In addition, if $R^2$ and $R^3$ have a structure containing at least one member selected from the group consisting of long-chain alkyl groups, a benzene ring, and a naphthalene ring, then the lipophilicity increases, and high water resistance is therefore displayed when the amide-group-containing polyacetal is, for example, used for films or plastics. If the amide-group-containing polyacetal is a polymer further including the below-mentioned glyoxylic salt structure unit (5) along with acetal structure unit (1) when $R^2$ and $R^3$ have a structure containing at least one member selected from the group consisting of long-chain alkyl groups, a benzene ring, and a naphthalene ring, then the amide-group-containing polyacetal has both the surface activity and the water-solubility.

The ratio of acetal structure unit (1) in the amide-group-containing polyacetal is not especially limited, but is preferably 0.1 weight % or more, more preferably 1 weight % or more, of the whole amide-group-containing polyacetal. In the case where the ratio of acetal structure unit (1) is less than 0.1 weight %, the hydrolysisproofness and the detergency are both low, and further, according to the kinds of $R^2$ and $R^{3,}$ inferior results might be provided with regard to the physical properties such as water-solubility (especially when $R^2$ and $R^3$ are, for example, a hydrogen atom or a methyl group), surface activity (especially when $R^2$ and $R^3$ are, for example, an alkyl group with 5 to 18 carbon atoms or a benzyl group), gelation resistance (especially when $R^2$ and $R^3$ are, for example, groups including $SO_3H$), and water repellent (especially when $R^2$ and $R^3$ are, for example, an alkyl group with 5 to 18 carbon atoms or a benzyl group).

The amide-group-containing polyacetal may be a homopolymer consisting of the above acetal structure unit (1) or a copolymer including both acetal structure unit (1) and another structure unit. Examples of the "another structure unit" include: structure units as derived from alkylene glycols such as propylene glycol (alkylene glycol structure unit); and acetal structure units as are, for example, derived from formaldehyde, acetaldehyde, 1,3-dioxolane, and glyoxylic esters or salts. Among these structure units, the structure unit of general formula (5) below (glyoxylic salt structure unit (5)), as derived from a glyoxylic salt, enhances the water-solubility.

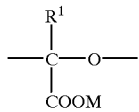

(5)

wherein: $R^1$ denotes at least one member selected from the group consisting of a hydrogen atom, a methyl group, an ethyl group, and a halogen atom; and M denotes at least one member selected from the group consisting of alkaline metals, alkaline earth metals, an ammonium group, and organic amine groups.

Examples of M include: a potassium atom, a sodium atom, a calcium atom, a magnesium atom, an $NH_4$ group, and a methylamine group. These can exist alone respectively or coexist with each other.

The ratio of glyoxylic salt structure unit (5) in the whole amide-group-containing polyacetal, is not especially limited, but is preferably in the range of 1~99 weight %, more preferably 5~90 weight %, and most preferably 30~70 weight %, of the whole amide-group-containing polyacetal.

When the amide-group-containing polyacetal is a copolymer, it may be any of a random copolymer, an alternating copolymer, and a block copolymer. Among these, the random copolymer and the block copolymer are easily produced.

The weight-average molecular weight of the amide-group-containing polyacetal is not especially limited, but is preferably in the range of 500~1,000,000 and more preferably 1,000~500,000.

The terminal structure of the amide-group-containing polyacetal is not especially limited, but examples thereof are terminal structures including alkoxy groups as derived from aliphatic, aromatic, and alicyclic alcohols.

The amide-group-containing polyacetal of the present invention is preferably produced by the present invention production process as mentioned below in detail, but may be produced by other methods, for example, comprising the step of polymerizing a monomer including amide-group-containing compound (6) of the following general formula (6):

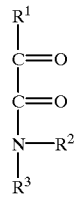

(6)

Wherein: examples of $R^1$, $R^2$ and $R^3$ include what is explained above.

(Production Process of Amide-Group-Containing Polyacetal):

The production process of the amide-group-containing polyacetal, according to the present invention, is a process comprising the step of carrying out an ester-amide exchange reaction between an ester-group-containing polyacetal having acetal structure unit (3) in its molecule and an amine. This process gives an alcohol as a by-product besides the aimed amide-group-containing polyacetal.

Acetal structure unit (3) in the ester-group-containing polyacetal, as used in the present invention production process, is not especially limited providing that it is shown by the above formula (3). Examples of $R^1$ include what is explained above. $R^5$ denotes an alkyl group with 1 to 4 carbon atoms.

Examples of the alkyl group with 1 to 4 carbon atoms include methyl, ethyl, propyl, and butyl. These groups can exist alone respectively or coexist with each other. Among the alkyl groups with 1 to 4 carbon atoms, methyl group having high reactivity is preferable.

The ratio of acetal structure unit (3) in the ester-group-containing polyacetal is not especially limited, but is preferably 0.1 weight % or more, more preferably 1 weight % or more, and most preferably 5 weight % or more, of the whole ester-group-containing polyacetal. When the ratio of acetal structure unit (3) is less than 0.1 weight %, the hydrolysisproofness and detergency of the resultant amide-group-containing polyacetal might be low.

The ester-group-containing polyacetal may be a homopolymer consisting of the above acetal structure unit (3) or a copolymer including both acetal structure unit (3) and another structure unit. Examples of the "another structure unit" include: structure units as derived from alkylene glycols such as propylene glycol (alkylene glycol structure unit); and acetal structure units other than acetal structure unit (3), as are, for example, derived from formaldehyde, acetaldehyde, 1,3-dioxolane, and glyoxylic esters or salts.

When the ester-group-containing polyacetal is a copolymer, it may be any of a random copolymer, an alternating copolymer, and a block copolymer. Among these, the random copolymer and the block copolymer are easily produced.

The weight-average molecular weight of the ester-group-containing polyacetal is not especially limited, but is preferably in the range of 500~1,000,000 and more preferably 1,000~500,000.

The terminal structure of the ester-group-containing polyacetal is not especially limited, but examples thereof are terminal structures including alkoxy groups as derived from aliphatic, aromatic, and alicyclic alcohols.

The ester-group-containing polyacetal, for example, can be produced by a process as described in JP-A-54-052196.

The amine, as used in the production process of the present invention, is not especially limited providing that it is a nitrogen-containing compound with at lease one active hydrogen atom as directly linked to the nitrogen atom. The amine may be either a so-called amine or an ionic amine salt with an ionic bond. Examples of the amine include amine (7) of the following general formula (7) and its salts.

$$HNR^2R^3 \qquad (7)$$

wherein: $R^2$ and $R^3$ are, for example, those which are explained above, and may be the same as each other at the same time or different from each other.

If $R^2$ and $R^3$ are at least one member selected from the group consisting of a hydrogen atom, a methyl group, and an ethyl group, then the resultant amide-group-containing polyacetal has the water-solubility. In addition, if $R^2$ and $R^3$ have a structure containing at least one member selected from the group consisting of long-chain alkyl groups, a benzene ring, and a naphthalene ring, then the lipophilicity of the resultant amide-group-containing polyacetal increases, and high water resistance is therefore displayed when the amide-group-containing polyacetal is, for example, used for films or plastics. If the resultant amide-group-containing polyacetal is a polymer further including the above-mentioned glyoxylic salt structure unit (5) along with acetal structure unit (1) when $R^2$ and $R^3$ have a structure containing at least one member selected from the group consisting of long-chain alkyl groups, a benzene ring, and a naphthalene ring, then the amide-group-containing polyacetal has both the surface activity and the water-solubility.

Examples of amine (7) include: ammonia, aliphatic amines such as methylamine, dimethylamine, ethylamine, diethylamine, laurylamine, stearylamine, and allyl amine; hydroxyl-group-containing amines such as diethanolamine; aromatic amines such as aniline, benzylamine, naphthylamine, and those of which the aromatic ring has a substituent; aliphatic-amino-based amphoteric compounds having an amino group and an acid group with an atom such as sulfur or phosphorus (e.g. aminomethanesulfonic acid, taurine, cysteamine); polyalkylene glycol amines; and polyamines such as ethylenediamine and N,N-dimethylethylenediamine. These may be used alone respectively or in combinations with each other. Examples of the acid group in the above amino-based compound include a sulfonic acid group, a mercapto group, and a phosphoric acid group.

With regard to the aliphatic-amino-based amphoteric compound as an example of amine (7), if its acid group is $SO_3H$, then the resultant amide-group-containing polyacetal displays high gelation resistance when used as a water-soluble polymer, and further, if the acid group is SH, then the chelating force to heavy metals appears.

With regard to the polyamine as an example of amine (7), if the N-substituent in the amino group is at least one member selected from the group consisting of a hydrogen atom, a methyl group, and an ethyl group, then the resultant amide-group-containing polyacetal has the cationic nature, and its flocculation ability is high.

Examples of the salt of amine (7) include: mineral acid salts such as hydrochloride and sulfate of amine (7); organic acid salts such as acetate, propionate, and alkylsulfonates of amine (7). These may be used alone respectively or in combinations with each other.

The amount of the amine, as used, is not especially limited, but is preferably in the range of 0.0001~2 mol, more preferably 0.1~1.1 mol, per 1 mol of acetal structure unit (3) as included in the ester-group-containing polyacetal. When the amount of the amine, as used, is smaller than 0.0001 mol, the amount of the amine might be too small to carry out the ester-amide exchange reaction. On the other hand, when the amount of the amine, as used, exceeds 2 mol, the step of removing the unreacted amines is needed.

In the production process of the present invention, reaction solvents may be used. The reaction solvent is not especially limited providing that it does not react with the starting ester-group-containing polyacetal or the resultant amide-group-containing polyacetal. Examples of the reaction solvent include: water; alcohols such as methanol and ethanol; ketones such as acetone; amides such as dimethylformaldehyde; sulfoxides such as dimethyl sulfoxide; hydrocarbon halides such as methylene chloride; ethers such as dioxane; esters; and hydrocarbons. These may be used alone respectively or in combinations with each other.

The amount of the reaction solvent, as used, is not especially limited, but is preferably in the range of 5~2,000 weight parts, more preferably 10~1,000 weight parts, per 100 weight parts of the amide-group-containing polyacetal. When the amount of the reaction solvent, as used, is smaller than 5 weight parts, the viscosity of the reaction system might be so high that the ester-amide exchange reaction could not uniformly be carried out. On the other hand, when the amount of the reaction solvent, as used, exceeds 2,000 weight parts, the ester-amide exchange reaction might be slow.

The reaction temperature for the ester-amide exchange reaction is not especially limited, but is preferably in the range of –50~150° C., more preferably 0~100° C., and most preferably 0~50° C. When the reaction temperature is –50° C. or below, the ester-amide exchange reaction might be impossible of execution. On the other hand, when the reaction temperature exceeds 150° C., a side reaction might occur to lower the yield of the resultant amide-group-containing polyacetal.

In the production process of the present invention, the ester-amide exchange reaction may be what exchanges all ester groups in acetal structure unit (3) with amide groups or what exchanges only a part of the ester groups with amide groups and leaves the residual ester groups as they are. In the latter case, it is preferable that the present invention production process further includes the step of converting the residual ester groups into carboxylic salt groups by hydrolysis.

The hydrolysis of the ester group is, for example, carried out by reacting in a solvent, which comprises water and might fitly further comprise an organic solvent miscible with water, in the presence of basic catalysts such as sodium carbonate, sodium hydrogen carbonate, and sodium hydroxide. The amount of the basic catalyst, as used, is not especially limited, but is preferably in the range of 1~2 mol, more preferably 1.1~1.5 mol, per 1 mol of the residual ester group. When the amount of the basic catalyst, as used, is smaller than 1 mol per 1 mol of ester group, the hydrolysis of the ester group might not sufficiently run. On the other hand, when the amount of the basic catalyst, as used, exceeds 2 mol per 1 mol of ester group, even the amide group might be hydrolyzed.

The reaction temperature for the hydrolysis is not especially limited, but is preferably in the range of 35~80° C., more preferably 45~65° C. When the reaction temperature is 35° C. or below, the hydrolysis might not run, or even if the hydrolysis ran, the reaction rate might be very slow. On the other hand, when the reaction temperature exceeds 80° C., a side reaction might occur.

The reaction apparatus, as used in the present invention, may be either a batch or continuous type.

(Uses of Amide-Group-Containing Polyacetal):

The amide-group-containing polyacetal of the present invention, for examples, can be used for detergent builders, cement dispersants, pigment dispersants, fiber-treating agents, paper production chemicals, water-treating agents, flocculants, pressure sensitive adhesives, ceramic binders, and films. Hereinafter, the detergent builder, the cement dispersant, the pigment dispersant, and the water-treating agent are illustrated in detail.

Detergent Builder and Detergent Composition:

The detergent builder, according to the present invention, comprises the aforementioned amide-group-containing polyacetal. The detergent builder is a component that is added to a detergent composition together with a surfactant, and displays high detergency and has biodegradability, and is excellent with regard to dispersibility and chelating ability. When washing is carried out, the detergent builder serves to maintain the pH of an aqueous solution containing the detergent composition at a constant value, to scavenge components, such as a calcium ion, in the aqueous solution, to disperse dirt, as removed from objects being washed, into the aqueous solution, and to prevent the dirt from attaching again to the objects being washed.

The amide-group-containing polyacetal as included in the detergent builder is not especially limited if it is the aforementioned one, but it is preferable that at least one of $R^2$ and $R^3$ in acetal structure unit (1) is at least one member selected from the group consisting of long-chain alkyl groups with 6 to 18 carbon atoms, a phenyl group, and a naphthyl group, and it is more preferable that the above amide-group-containing polyacetal is a copolymer further including the aforementioned glyoxylic salt structure unit (5).

The ratio of acetal structure unit (1), composing the amide-group-containing polyacetal as included in the detergent builder, is preferably in the range of 0.1~70 weight %, more preferably 1~50 weight %, most preferably 5~30 weight %, of the whole amide-group-containing polyacetal. In the case where the ratio of acetal structure unit (1) is less than 0.1 weight % of the whole amide-group-containing polyacetal, the surface activity due to the inclusion of the amide group might not emerge, and the detergency might therefore be low, and particularly when the amide-group-containing polyacetal is added to liquid detergent compositions, its compatibility might be low. On the other hand, in the case where the ratio of acetal structure unit (1) is more than 70 weight % of the whole amide-group-containing polyacetal, the metal chelating ability or the dispersibility might be low.

The weight-average molecular weight of the amide-group-containing polyacetal, as included in the detergent builder, is preferably in the range of 500~500,000, more preferably 1,000~100,000, and most preferably 2,000~50,000. In the case where the weight-average molecular weight of the amide-group-containing polyacetal is less than 500, the builder ability such as chelating ability or dispersibility might be low. On the other hand, in the case where the weight-average molecular weight of the amide-group-containing polyacetal is more than 500,000, such an amide-group-containing polyacetal might be difficult to produce, and the dispersibility might be low, and particularly when the amide-group-containing polyacetal is added to liquid detergent compositions, its compatibility might be low.

The detergent builder may further comprise components other than the amide-group-containing polyacetal, for example, the following: polymer builders such as other acetal-based polymers and vinylic polymers; enzymes such as protease, (alkali) lipase, and (alkali) cellulase; alkali builders such as silicates, carbonates, and sulfates; and chelate builders such as diglycolic acid, oxycarboxylates, EDTA (ethylenediaminetetraacetate), DTPA (diethylenetriaminehexaacetate), and citric acid.

The content of the amide-group-containing polyacetal in the detergent builder is not especially limited, but is preferably in the range of 1~100 weight %, more preferably 5~80 weight %, of the detergent builder. In the case where the content of the amide-group-containing polyacetal is less than 1 weight %, the dispersibility or the chelating ability might be low and the detergent ability might therefore not sufficiently be displayed.

The detergent builder can be used for either a liquid or powdered detergent composition. However, the amide-group-containing polyacetal, as included in the detergent builder, has excellent compatibility with the below-mentioned surfactant and therefore can easily give a liquid detergent composition which comprises the amide-group-containing polyacetal and the surfactant in high concentrations.

The detergent composition, according to the present invention, includes the surfactant and the above-mentioned amide-group-containing polyacetal as the essential components. The amide-group-containing polyacetal, as included in this detergent composition, displays high detergency and has biodegradability, and is excellent with regard to dispersibility and chelating ability. Therefore, in aqueous solutions including the above detergent composition, the pH is maintained at a constant value, and components such as a calcium ion are scavenged, and dirt as removed from objects being washed is dispersed into the aqueous solution and prevented from attaching again to the objects being washed.

The amide-group-containing polyacetal as explained on the aforementioned detergent builder can preferably be exemplified as the amide-group-containing polyacetal that is included in the detergent composition.

An example of the surfactant, as included in the detergent composition, is at least one member selected from the group consisting of anionic surfactants, nonionic surfactants, cationic surfactants, and amphoteric surfactants. These surfactants may be used alone respectively or in combinations with each other.

Examples of the anionic surfactant include alkylbenzenesulfonic acid salts, alkyl or alkenyl ether sulfuric acid salts, alkyl- or alkenylsulfuric acid salts, α-olefinsulfonic acid salts, α-sulfofatty acids or ester salts thereof, alkanesulfonic acid salts, saturated or unsaturated fatty acid salts, alkyl or alkenyl ether carboxylic acid salts, amino acid type surfactants, N-acylamino acid type surfactants, and alkyl- or alkenylphosphoric acid esters or salts thereof.

Examples of the nonionic surfactant include polyoxyalkylene alkyl or alkenyl ethers, polyoxyethylene alkyl phenyl ethers, higher fatty acid alkanolamides or alkylene oxide adducts thereof, sucrose fatty acid esters, alkyl glycoxides, fatty acid glycerol monoesters, and alkylamine oxides.

Examples of the cationic surfactant include quaternary ammonium salts.

Examples of the amphoteric surfactant include carboxyl type or sulfobetaine type amphoteric surfactants.

The concentration of the surfactant in the detergent composition is not especially limited, but is preferably in the range of 10~60 weight %, more preferably 15~50 weight %, of the detergent composition. In the case where the concentration of the surfactant is less than 10 weight %, there is a possibility that the detergency could not sufficiently be displayed. On the other hand, in the case where the concentration of the surfactant is more than 60 weight %, economic disadvantages are involved.

The concentration of the amide-group-containing polyacetal in the detergent composition is not especially limited, but is preferably in the range of 0.1~60 weight %, more preferably 1~30 weight %, of the detergent composition. In the case where the concentration of the amide-group-containing polyacetal is less than 0.1 weight %, there is a possibility that the detergency could not sufficiently be displayed. On the other hand, in the case where the concentration of the amide-group-containing polyacetal is more than 60 weight %, economic disadvantages are involved.

If necessary, the detergent composition can further include components other than the surfactant and the amide-group-containing polyacetal, for example, the following: enzymes such as protease, (alkali) lipase, and (alkali) cellulase; polymer builders such as other acetal-based polymers and vinylic polymers; alkali builders such as silicates, carbonates, and sulfates; chelate builders such as diglycolic acid, oxycarboxylates, EDTA (ethylenediaminetetraacetate), DTPA (diethylenetriaminehexaacetate), and citric acid; reattachment inhibitors; fluorescent agents; bleachers; perfumes; and zeolite. These other components may be used alone respectively or in combinations with each other. Incidentally, the liquid detergent composition may either contain water or be free of water.

Among the enzymes, particularly, those which are high active in alkali liquids are preferable, examples of which include alkali lipase and alkali cellulase. In addition, the concentration of the enzyme in the detergent composition is usually in the range of 0.01~5 weight % of the detergent composition. In the case where the enzyme concentration is less than 0.01 weight %, sufficient detergency cannot be displayed. In the case where the enzyme concentration is more than 5 weight %, economic disadvantages are involved.

The detergent composition may be either a liquid or powdered one. However, the amide-group-containing polyacetal and the surfactant, as included in the detergent composition, have excellent compatibility with each other, so the liquid detergent composition can contain them in high concentrations.

As to the amide-group-containing polyacetal as included in the detergent builder or composition, what is obtained by the aforementioned production process is preferable.

Cement Dispersant:

The cement dispersant comprises the aforementioned amide-group-containing polyacetal.

The amide-group-containing polyacetal as included in the cement dispersant is not especially limited if it is the aforementioned one. However, such as includes glyoxylic salt structure unit (5) along with acetal structure unit (1) is preferable in that such an amide-group-containing polyacetal is excellent in water solubility. The weight-average molecular weight of the amide-group-containing polyacetal, as included in the cement dispersant, is preferably in the range of 2,000~50,000.

If the above-mentioned cement dispersant is used for cement compositions such as cement mortar and concrete, the amide-group-containing polyacetal displays the ability to improve the performance of the cement compositions as follows: the dispersibility can be improved, so the fluidity can be enhanced and the setting time can be lengthened without bringing about great retardment of the setting because of the addition of the cement dispersant. Therefore the workability of construction using mortar or concrete is greatly improved. Accordingly, this cement dispersant, for example, can be used as a fluidizing agent for concrete such as ready-mixed concrete. Particularly, this cement dispersant serves as a plant-simultaneously-added type high performance AE (air-entraining) water-reducing additive to easily enable the production of ready-mixed concrete having the composition of a high water-reducing ratio.

The cement dispersant, for example, can be used to disperse hydraulic cement, such as portland cement, alumina cement, and various types of mixed cement, and to disperse hydraulic materials other than cement, such as plaster.

The ratio of the combination of the cement dispersant to cement is not especially limited, but the amount of the cement dispersant is preferably in the range of 0.01~1.0 parts by weight relative to 100 parts by weight of cement.

Examples of methods for using the cement dispersant include: a method in which the cement dispersant is dissolved into knead-mixing water and then added simultaneously with the knead-mixing water in preparing a cement composition; and a method in which the cement dispersant is added to an already kneaded cement composition.

The cement dispersant can further be used as a high performance water-reducing additive for producing secondary concrete products, and can reduce the water content and therefore enhance the strength.

As to the amide-group-containing polyacetal as included in the cement dispersant, what is obtained by the aforementioned production process is preferable.

Pigment Dispersant:

The pigment dispersant includes the aforementioned amide-group-containing polyacetal.

The amide-group-containing polyacetal as included in the pigment dispersant is not especially limited if it is the aforementioned one. The pigment dispersant includes the amide-group-containing polyacetal as the essential component and may further include other components.

The pigment dispersant is used to disperse pigments, such as kaolin, clay, calcium carbonate, titanium oxide, barium sulfate, satin white, and magnesium hydroxide, into water.

The amide-group-containing polyacetal as included in the pigment dispersant is not especially limited if it is the aforementioned one. However, such as includes glyoxylic salt structure unit (5) along with acetal structure unit (1) is preferable in that such an amide-group-containing polyacetal is excellent in water solubility and its dispersibility is enhanced. The weight-average molecular weight of the amide-group-containing polyacetal, as included in the pigment dispersant, is preferably in the range of 1,000~50,000.

The ratio of the combination of the pigment dispersant to pigment is not especially limited, but the amount of the pigment dispersant is preferably in the range of 0.01~1.0 parts by weight relative to 100 parts by weight of pigment.

Because of the inclusion of the amide-group-containing polyacetal, the pigment dispersant can produce a dispersion that is excellent in dispersibility and has a low viscosity even in a high concentration and is excellent in stability. Therefore such a pigment dispersant can particularly favorably be used as a dispersant that is used to disperse pigments for paper, and further can widely be applied in fields such as fiber processing, building material processing, coatings, and ceramics.

As to the amide-group-containing polyacetal as included in the pigment dispersant, what is obtained by the aforementioned production process is preferable.

Water-Treating Agent:

The water-treating agent includes the aforementioned amide-group-containing polyacetal.

The amide-group-containing polyacetal as included in the water-treating agent is not especially limited if it is the aforementioned one. The water-treating agent includes the amide-group-containing polyacetal as the essential component and may further include other components.

The water-treating agent is excellent in chelating ability and scale inhibitability due to the amide-group-containing polyacetal, and therefore can be used to inhibit the formation of scale in systems such as cooling-water circulation systems, boiler water circulation systems, seawater desalination plants, pulp digesters, and black liquor evaporators.

The amide-group-containing polyacetal as included in the water-treating agent is not especially limited if it is the aforementioned one. However, such as includes glyoxylic salt structure unit (5) along with acetal structure unit (1) is preferable in that such an amide-group-containing polyacetal is excellent in water solubility and its dispersibility is enhanced. The weight-average molecular weight of the amide-group-containing polyacetal, as included in the water-treating agent, is preferably in the range of 500~50,000.

The ratio of the combination of the water-treating agent to water is not especially limited, but the amount of the water-treating agent is preferably in the range of 1~100 mg per liter of water.

As to the amide-group-containing polyacetal as included in the water-treating agent, what is obtained by the aforementioned production process is preferable.

BEST MODE FOR CARRYING OUT THE INVENTION

Figure 1:
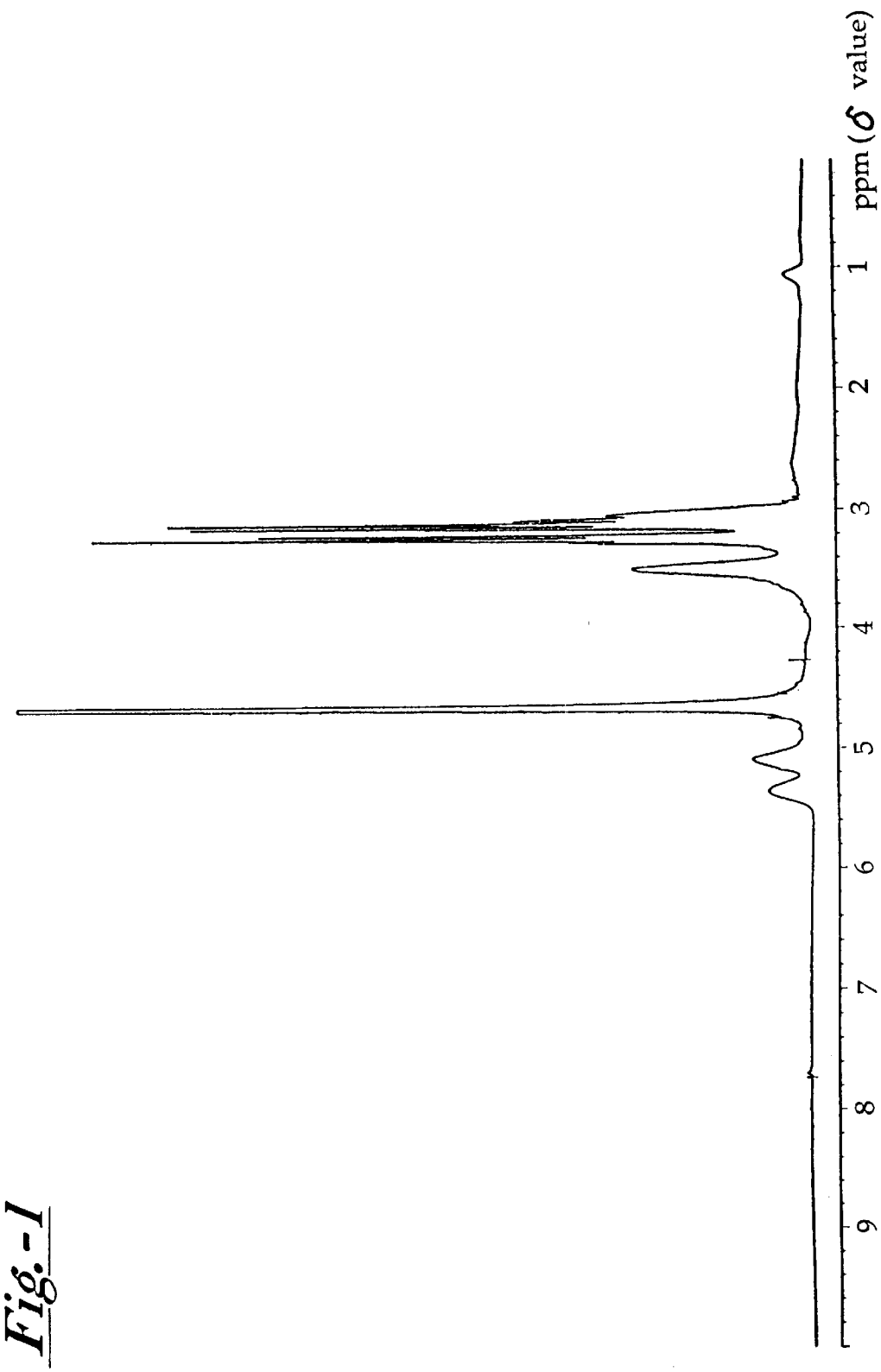
FIG. 1 is a proton nuclear magnetic resonance spectrogram of polymer G as obtained in Example 7.

Hereinafter, the present invention is more specifically illustrated by the following examples of some preferred embodiments in comparison with comparative examples not according to the invention. However, the present invention is not limited to these examples.

EXAMPLE 1

Poly(methyl glyoxylate), having acetal structure unit X (structure unit with $R^1$=hydrogen atom and $R^5$=methyl group in general formula (3)) as the repeating unit, was produced by polymerizing methyl glyoxylate by the process as described in U.S. Pat. No. 4,201,858.

Next, 10.0 g of poly(methyl glyoxylate), as obtained above, and 30.0 g of dioxane were placed into a 100 ml four-necked flask as fitted with a stirrer, a condenser, a thermometer, a nitrogen-introducing tube, and a dropping funnel, thus dissolving poly(methyl glyoxylate) into dioxane. While maintaining the internal temperature of the flask at 30° C. or below, 8.28 g of aqueous 28%-concentration ammonia was dropped into the resultant solution over a period of 30 minutes. After the dropping had finished, the reaction was carried out for another 2 hours. The resultant reaction solution was placed into diethyl ether and purified by reprecipitation, thus obtaining polymer A.

The weight-average molecular weight of polymer A was 6,000. The result of elemental analysis of polymer A was as follows: C: 33.9%, H: 4.37 %, 0: 43.65%, N: 18.08%. The proton nuclear magnetic resonance spectrum of polymer A was measured (solvent: heavy DMSO, standard substance: TMS, δ value), when peaks were detected at 5.1~5.3 (1H, ≡C—H) and 6.9~7.1 (2H, —NH$_2$). The infrared absorption spectrum of polymer A was measured, when characteristic absorptions were detected at 1100 cm$^{-1}$ (acetal group), about 1650~1700 cm$^{-1}$ (carbonyl group of amide) and about 3100~3300 cm$^{-1}$ (NH of amide group). From the above results, it was confirmed that polymer A was an amide-group-containing polyacetal having acetal structure unit A (structure unit of general formula (1) where $R^1=R^2=R^3=$hydrogen atom) as the repeating unit.

As to polymer A, the following solubility test was carried out. The results are shown in Table 1.

Solubility Test:

First of all, 0.5 g of sample was placed into a screw tube, and 5 g of water was then placed into the tube. The contents of the tube were stirred and then allowed to stand stationary, thus measuring the solubility. Next, water was changed to methanol, ethyl acetate, cyclohexane or toluene to measure the respective solubilities. What dissolved the sample was evaluated as ○ and what did not was evaluated as x.

EXAMPLE 2

Polymer B was obtained in the same way as of Example 1 except that 6 g of dimethylamine was used instead of the aqueous ammonia.

The weight-average molecular weight of polymer B was 6,500. The proton nuclear magnetic resonance spectrum of polymer B was measured (solvent: heavy DMSO, standard substance: TMS, δ value), when peaks were detected at 3.0~3.1 (6H, 3H×2) and 5.4~5.7 (1H, ≡C—H). The infrared absorption spectrum of polymer B was measured, when characteristic absorptions were detected at 1100 cm$^{-1}$ (acetal group) and about 1650 cm$^{-1}$ (carbonyl group of amide). From the above results, it was confirmed that polymer B was an amide-group-containing polyacetal having acetal structure unit B (structure unit of general formula (1) where $R^1$=hydrogen atom and $R^2=R^3=$methyl group) as the repeating unit.

As to polymer B, the solubility test was carried out in the same way as of Example 1. The results are shown in Table 1.

EXAMPLE 3

Polymer C was obtained in the same way as of Example 1 except that 7.3 g of dodecylamine was used instead of the aqueous ammonia.

The weight-average molecular weight of polymer C was 9,000. The proton nuclear magnetic resonance spectrum of polymer C was measured (solvent: heavy DMSO, standard substance: TMS, δ value), when peaks were detected at 0.7~0.9 (0.9H), 1.1~1.3 (6.6H), 3.6~3.8 (2.H), 5.4~5.7 (1H), and about 7.3 (0.3H). The infrared absorption spectrum of polymer C was measured, when characteristic absorptions were detected at 1100 cm$^{-1}$ (acetal group), about 1630 cm$^{-1}$ (carbonyl group of amide), about 1750 cm$^{-1}$ (carbonyl group of ester) and about 3200 cm$^{-1}$ (NH of amide group). From the above results, it was confirmed that polymer C was an amide-group-containing polyacetal having acetal structure unit C (structure unit of general formula (1) where $R^1=R^2=$hydrogen atom and $R^3=$dodecyl group) and acetal structure unit X (structure unit of general formula (3) where $R^1=$hydrogen atom and $R^5=$methyl group) as the repeating units. Incidentally, in polymer C, the molar ratio of acetal structure unit C to acetal structure unit X was acetal structure unit C: acetal structure unit X=28:72.

As to polymer C, the solubility test was carried out in the same way as of Example 1. The results are shown in Table 1.

As to polymer C, the following hydrolysisproofness test was carried out. The results are shown in Table 2.

Hydrolysisproofness Test:

First of all, 0.5 g of the amide-group-containing polyacetal was shaped into a film and then placed into 5 g of a standard buffer solution (pH=9, an aqueous borate solution), and they were left stationary at room temperature to observe the condition of the sample by the eye. The case where no change was seen for the sample was evaluated as ○ and the case where the sample white-clouded was evaluated as Δ, and the case where the sample disintegrated was evaluated as x, and the case where the sample disintegrated into fine pieces was evaluated as xx.

EXAMPLE 4

A 100 ml four-necked flask, as fitted with a stirrer, a condenser, a thermometer, a nitrogen-introducing tube, and two 20 ml dropping funnels, were prepared. A solution, in which 5 g of polymer C as obtained in Example 3 was dissolved in 10 g of acetone, was placed into one of the dropping funnels, and a solution, in which 3.6 g of sodium carbonate monohydrate was dissolved in 15 g of pure water, was placed into the other dropping funnel. While maintaining the inside of the four-necked flask at 50° C., the above-mentioned two solutions were dropped from the respective dropping funnels over a period of 30 minutes. The resultant reaction solution was dried under vacuum, thus obtaining polymer D.

The weight-average molecular weight of polymer D was 8,600. The proton nuclear magnetic resonance spectrum of polymer D was measured (solvent: heavy water, standard substance: TMS, δ value), when peaks were detected at 0.7~0.9 (0.9H), 1.1~1.7 (6.6H), 5.2~5.4 (1H), and about 7.1 (0.3H). From this result, it was confirmed that polymer D was an amide-group-containing polyacetal having acetal structure unit C (structure unit of general formula (1) where $R^1=R^2$=hydrogen atom and $R^3$=dodecyl group) and glyoxylic salt structure unit Z (structure unit of general formula (5) where $R^1$=hydrogen atom and M=sodium atom) as the repeating units. Incidentally, in polymer D, the molar ratio of acetal structure unit C to glyoxylic salt structure unit Z was acetal structure unit C:glyoxylic salt structure unit Z=28:72.

As to polymer D, the following tests for osmosis, compatibility to liquid detergent composition, detergency, and biodegradability were carried out. The results are shown in Table 3.

Osmosis Test (surface activity test):

First of all, 0.5 g of the amide-group-containing polyacetal was weighed out and then placed into a 500 ml beaker, and 500 g of pure water was then added into the beaker to dissolve the sample. On the resultant aqueous solution, a sheet of artificially contaminated cloth (5 cm×5 cm, made by the Japanese Laundry Research Association was floated, and the time as spent for the sinking of the cloth to the bottom of the beaker was measured three times and averaged. The shorter the above time is, the higher the osmosis is. Incidentally, the artificially contaminated cloth was floated on pure water, and the time as spent for the sinking of the cloth to the bottom was measured and regarded as the blank.

Test of Compatibility to Liquid Detergent Composition:

An aqueous detergent solution was prepared by combining 5 parts by weight of the amide-group-containing polyacetal with a liquid detergent comprising 10 parts by weight of sodium polyoxyethylene laurylsulfate, 10 parts by weight of Softanol 70H (made by Nippon Shokubai Co., Ltd.), 20 parts by weight of sodium dodecylbenzenesulfonate, 10 parts by weight of ethanol, and 45 parts by weight of water, and its compatibility at 25° C. was evaluated as follows: what formed a homogeneous transparent liquid was evaluated as ○; and what formed precipitation, turbidity, or separation was evaluated as X.

Detergency Test:

Ten sheets of artificially contaminated cloth of 5 cm×5 cm (artificially contaminated wet cloth made by the Japanese Laundry Research Association were placed into 1,000 ml of an aqueous detergent solution including the amide-group-containing polyacetal, and then washed at 100 rpm with Terg-O-Tometer under the following conditions:

(Washing conditions):

Detergent concentration: 0.05 weight %
Washing temperature: 25° C.
Washing time: 10 minutes
Hardness of water: 3 DH
Rinsing: 2 minutes with tap water The detergency was evaluated by measuring the respective reflectivities of the contaminated cloth with a color difference meter before and after washing, and by calculating the washing ratio (%) from the formula below. The washing ratios in Table 3 are average values of the ten sheets.

$$\text{Washing ratio}(\%) = \frac{[(\text{reflectivity after washing}) - (\text{reflectivity before washing})]}{[(\text{reflectivity of original cloth}) - (\text{reflectivity before washing})]} \times 100$$

The result of the washing with regard to an aqueous detergent solution free of the amide-group-containing polyacetal was taken as the blank, and its washing ratio was 25%.

Biodegradability Test:

The biodegradability was evaluated by measuring the biodegradation ratio (%) in accordance with the revised MITI test (I) method as disclosed in the OECD guide line.

EXAMPLE 5

Polymer E was obtained in the same way as of Example 1 except that 4.3 g of benzylamine was used instead of the aqueous ammonia.

The weight-average molecular weight of polymer E was 7,200. The proton nuclear magnetic resonance spectrum of polymer E was measured (solvent: heavy DMSO, standard substance: TMS, δ value), when peaks were detected at 3.2~3.4 (2.3H), 4.0~4.3 (0.5H), 5.7~6.0 (1H), and 7.0~7.3 (1.5H). The infrared absorption spectrum of polymer E was measured, when characteristic absorptions were detected at 1100 $cm^{-1}$ (acetal group), about 1620 $cm^{-1}$ (carbonyl group of amide), about 1780 $cm^{-1}$ (carbonyl group of ester) and about 3300 $cm^{-1}$ (NH of amide group). From the above results, it was confirmed that polymer E was an amide-group-containing polyacetal having acetal structure unit E (structure unit of general formula (1) where $R^1=R^2$=hydrogen atom and $R^3$=benzyl group) and acetal structure unit X (structure unit of general formula (3) where $R^1$=hydrogen atom and $R^5$=methyl group) as the repeating units. Incidentally, in polymer E, the molar ratio of acetal structure unit E to acetal structure unit X was acetal structure unit E:acetal structure unit X=26:74.

As to polymer E, the solubility test was carried out in the same way as of Example 1. The results are shown in Table 1.

As to polymer E, the hydrolysisproofness test was carried out in the same way as of Example 3. The results are shown in Table 2.

EXAMPLE 6

Polymer F was obtained in the same way as of Example 4 except that polymer E as obtained in Example 5 was used instead of polymer C as obtained in Example 3.

The weight-average molecular weight of polymer F was 7,000. The proton nuclear magnetic resonance spectrum of polymer F was measured (solvent: heavy water, standard substance: TMS, δ value), when peaks were detected at 4.0~4.3 (1H), 5.5~5.9 (2H), and 6.9~7.4 (3H). From this result, it was confirmed that polymer F was an amide-group-containing polyacetal having acetal structure unit E (structure unit of general formula (1) where $R^1=R^2=$ hydrogen atom and $R^3$=benzyl group) and glyoxylic salt structure unit Z (structure unit of general formula (5) where $R^1$=hydrogen atom and M=sodium atom) as the repeating units. Incidentally, in polymer F, the molar ratio of acetal structure unit F to glyoxylic salt structure unit Z was acetal structure unit F:glyoxylic salt structure unit Z=25:75.

As to polymer F, the tests for osmosis, compatibility to liquid detergent composition, detergency, and biodegradability were carried out in the same way as of Example 4. The results are shown in Table 3.

COMPARATIVE EXAMPLE 1

Poly(methyl glyoxylate) (comparative polymer A), having acetal structure unit X (structure unit of general formula (3) where $R^1$=hydrogen atom and $R^5$=methyl group) as the repeating unit, was produced by polymerizing methyl glyoxylate by the process as described in U.S. Pat. No. 4,201,858.

As to comparative polymer A, the solubility test was carried out in the same way as of Example 1. The results are shown in Table 1.

As to comparative polymer A, the hydrolysisproofness test was carried out in the same way as of Example 3. The results are shown in Table 2.

COMPARATIVE EXAMPLE 2

First of all, 0.9 g of an aqueous 48%-concentration sodium hydroxide solution and 16 g of pure water were placed into a flask as fitted with a stirrer, a condenser, a thermometer, a nitrogen-introducing tube, and two dropping funnels. A mixed solution of 10 g of comparative polymer A, as obtained in Comparative Example 1, and 5 g of methylene chloride was placed into one of the dropping funnels, and 9.4 g of an aqueous 48%-concentration sodium hydroxide solution was placed into the other dropping funnel. While heating the inside of the flask to 50° C., the dropping was carried out from the two dropping funnels at the same time over a period of 2 hours. After the dropping had finished, the temperature was maintained at 50° C. for 1 hour, and the resultant product was reprecipitated in methanol, thus producing poly(sodium glyoxylate) (comparative polymer B) having glyoxylic salt structure unit Z (structure unit of general formula (5) where $R^1$=hydrogen atom and M=sodium atom) as the repeating unit.

As to comparative polymer B, the tests for osmosis, compatibility to liquid detergent composition, detergency, and biodegradability were carried out in the same way as of Example 4. The results are shown in Table 3.

The properties of comparative polymer B, such as osmosis, compatibility to liquid detergent composition, and detergency, are inferior to those of polymers D and F. Incidentally, the biodegradation ratios of polymers D and F are both lower than that of comparative polymer B, but are both 60% or more. Therefore, polymers D and F both have sufficient biodegradability.

EXAMPLE 7

Solution A was prepared by dissolving 30 g of poly (methyl glyoxylate), as obtained in the same way as of Example 1, into 100 g of 1,3-dioxolane, and solution B was prepared by dissolving 46.9 g of taurine and 15 g of sodium hydroxide into 100 g of water. Next, a mixed solution, comprising 0.3 g of triethylamine, 10 g of water, and 10 g of 1,3-dioxolane, was heated to 60° C., and then solutions A and B above were simultaneously dropped to the mixed solution. The resultant reaction solution was placed into ethanol, filtered, and then dried under vacuum at 40° C. for 10 hours, thus obtaining polymer G.

Figure 2:
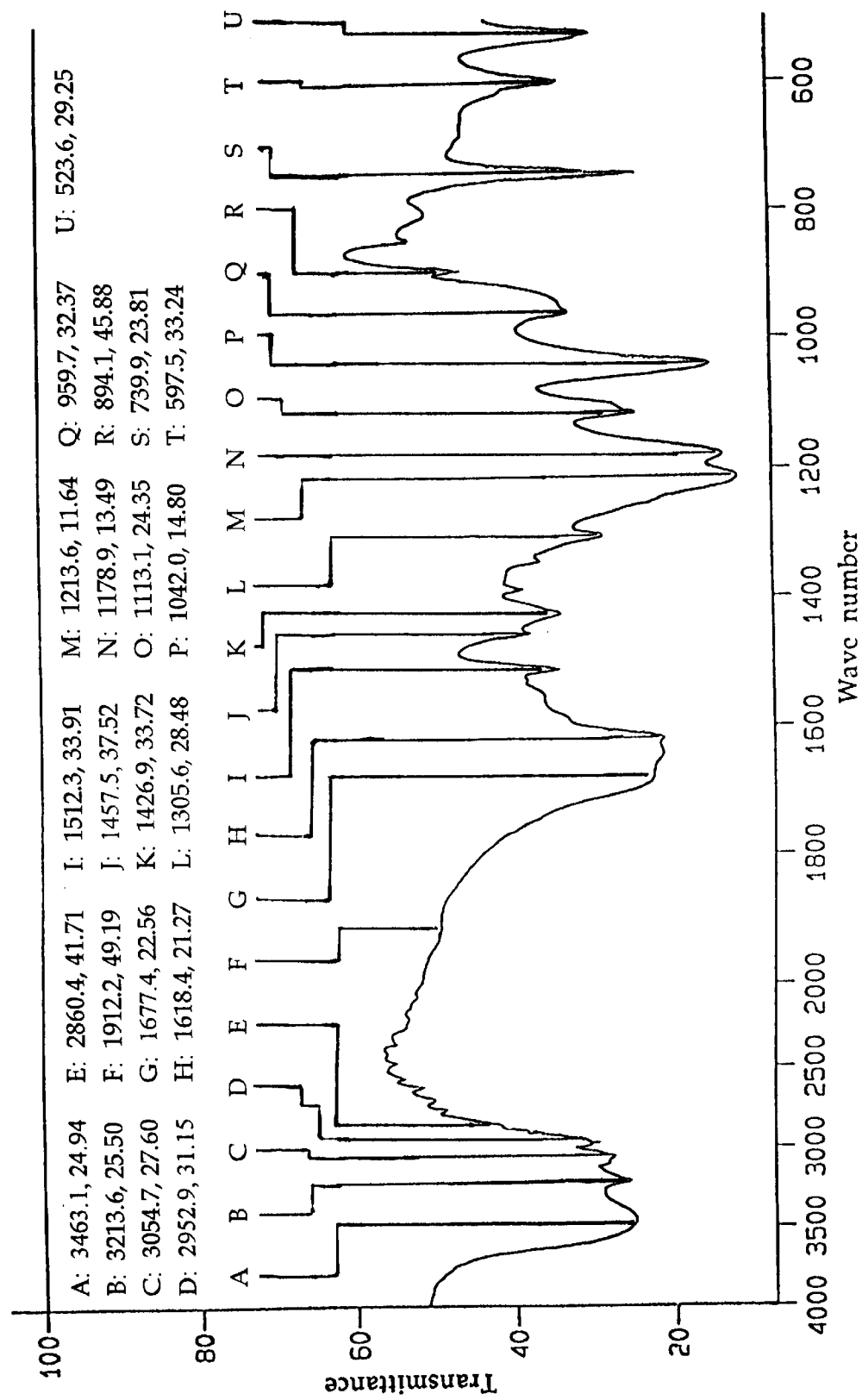
FIG. 2 is an infrared absorption spectrogram of polymer G as obtained in Example 7.

The weight-average molecular weight of polymer G was 10,500. The proton nuclear magnetic resonance spectrum of polymer G was measured (solvent: heavy water, δ value), when peaks were detected at 5.0~5.4 (1H), 2.95~3.15 (1.54H), and 3.4~3.7 (1.54H) as shown in FIG. 1. The infrared absorption spectrum of polymer G was measured, when characteristic absorptions were detected at about 600~about 700 $cm^{-1}$ (NH of amide group), about 1100 $cm^{-1}$ (acetal group), 1180 $cm^{-1}$ (SO group of sulfonic acid), about 1620 $cm^{-1}$ (carbonyl group of amide), and about 3000~about 3300 $cm^{-1}$ (NH of amide group) as shown in FIG. 2. From the above results, it was confirmed that polymer G was an amide-group-containing polyacetal having acetal structure unit G (structure unit of general formula (1) where $R^1=R^2$=hydrogen atom and $R^3$=group of general formula (4) where n=2 and A=$SO_3Na$) and glyoxylic salt structure unit ZZ (structure unit of general formula (5) where $R^1$=hydrogen atom and M=$NH_3C_2H_4SO_3Na$) as the repeating units. Incidentally, in polymer G, the molar ratio of acetal structure unit G to glyoxylic salt structure unit ZZ was acetal structure unit G:glyoxylic salt structure unit ZZ=77:23.

As to polymer G, the solubility test was carried out in the same way as of Example 4. The results are shown in Table 1.

TABLE 1

|  | Example 1 | Example 2 | Example 3 | Example 5 | Example 7 | Comparative Example 1 |
| --- | --- | --- | --- | --- | --- | --- |
| Water | o | o | x | x | o | x |
| Methanol | o | o | x | x | x | x |
| Ethyl acetate | x | o | o | o | x | x |
| Cyclohexane | x | x | o | x | x | x |
| Toluene | x | x | o | o | x | x |

TABLE 2

|  | Example 3 | Example 5 | Comparative Example 1 |
| --- | --- | --- | --- |
| After 2 hours | o | o | Δ |
| After 1 day | o | o | x |
| After 2 days | o | o | xx |

TABLE 3

|  | Blank | Example 4 | Example 6 | Comparative Example 2 |
|---|---|---|---|---|
| Osmosis test (seconds) | 43 | 16 | 18 | 31 |
| Test of compatibility to liquid detergent composition (25° C.) | — | ○ | ○ | x |
| Detergency test (%) | 25 | 44 | 42 | 35 |
| Biodegradability test (%) | — | 75 | 73 | 83 |

INDUSTRIAL APPLICATION

The amide-group-containing polyacetal, according to the present invention, is novel, has biodegradability, and displays hydrolysisproofness and detergency at high levels.

The production process of the amide-group-containing polyacetal, according to the present invention, can easily give the above polyacetal.

The detergent builder, according to the present invention, has biodegradability, displays hydrolysisproofness and detergency at high levels, and is excellent in dispersibility and chelating ability, because this detergent builder comprises the above amide-group-containing polyacetal.

The detergent composition, according to the present invention, has biodegradability, displays hydrolysisproofness and detergency at high levels, and is excellent in dispersibility and chelating ability, and therefore can prevent dirt from re-attaching to objects being washed, because this detergent composition includes the above amide-group-containing polyacetal.

We claim:

1. An amide-group-containing polyacetal, having acetal structure unit (1) of general formula (1) below in its molecule, wherein general formula (1) is

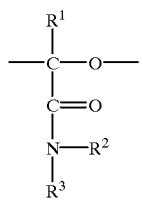

(1)

wherein: $R^1$ denotes at least one member selected from the group consisting of a hydrogen atom, a methyl group, an ethyl group, and a halogen atom; $R^2$ and $R^3$ are both at least one member selected from the group consisting of a hydrogen atom, alkyl groups with 1 to 18 carbon atoms, alkenyl groups with 2 to 18 carbon atoms, aromatic groups having at least one benzene ring, alkoxy groups (2) of general formula (2) below, and substituted alkyl groups (4) of general formula (4) below, and may be the same as each other at the same time or different from each other, wherein the alkyl groups, the alkenyl groups, and the benzene ring all may contain a substituent;

and wherein general formula (2) is

(2)

wherein: $R^4$ denotes at least one member selected from the group consisting of a hydrogen atom, alkyl groups, and aromatic groups having at least one benzene ring; m is 2 to 4; and l is 1 or more;

and wherein general formula (4) is $$A \text{—}(CH_2)_n\text{—}$$ (4)

wherein: A denotes at least one member selected from the group consisting of $SO_3H$, $SO_3Na$, SH and $NR^6R^7$, wherein $R^6$ and $R^7$ are both at least one member selected from the group consisting of a hydrogen atom, alkyl groups with 1 to 18 carbon atoms, alkenyl groups with 2 to 18 carbon atoms, and aromatic groups having at least one benzene ring, and may be the same as each other at the same time or different from each other, wherein the alkyl groups, the alkenyl groups, and the benzene ring all may contain a substituent; and n is 1 to 4.

2. An amide-group-containing polyacetal according to claim 1, further having glyoxylic salt structure unit (5) of general formula (5) below in its molecule, wherein general formula (5) is

(5)

wherein: $R^1$ denotes at least one member selected from the group consisting of a hydrogen atom, a methyl group, an ethyl group, and a halogen atom; and M denotes at least one member selected from the group consisting of alkaline metals, alkaline earth metals, an ammonium group, and organic amine groups.

3. An amide-group-containing polyacetal according to claim 1, wherein $R^2$ and $R^3$ in general formula (1) are both at least one member selected from the group consisting of a hydrogen atom, alkyl groups with 1 to 18 carbon atoms, aromatic groups having at least one benzene ring, and substituted alkyl groups (4).

4. An amide-group-containing polyacetal according to claim 1, wherein A in general formula (4) is at least one member selected from the group consisting of $SO_3H$, $SO_3Na$, and SH.

5. An amide-group-containing polyacetal according to claim 1, having a weight-average molecular weight of 500~500,000, wherein at least one of $R^2$ and $R^3$ in general formula (1) is at least one member selected from the group consisting of long-chain alkyl groups with 6 to 18 carbon atoms, a phenyl group, and a naphthyl group, and wherein the ratio of acetal structure unit (1) is in the range of 0.1~70 weight % of the whole amide-group-containing polyacetal.

6. A production process of an amide-group-containing polyacetal, comprising the step of carrying out an ester-amide exchange reaction between an ester-group-containing polyacetal having acetal structure unit (3) of general formula (3) below in its molecule and an amine, wherein general formula (3) is

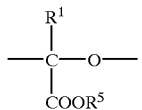
(3)

wherein: $R^1$ denotes at least one member selected from the group consisting of a hydrogen atom, a methyl group, an ethyl group, and a halogen atom; and $R^5$ denotes an alkyl group with 1 to 4 carbon atoms.

7. A production process according to claim 6, wherein a part of the ester groups are converted into amide groups, and then the residual ester groups are hydrolyzed.

8. A detergent builder, comprising the amide-group-containing polyacetal as recited in claim 1.

9. A detergent composition, comprising a surfactant and the amide-group-containing polyacetal as recited in claim 1.

10. An amide-group-containing polyacetal according to claim 2, wherein $R^2$ and $R^3$ in general formula (1) are both at least one member selected from the group consisting of a hydrogen atom, alkyl groups with 1 to 18 carbon atoms, aromatic groups having at least one benzene ring, and substituted alkyl groups (4).

11. An amide-group-containing polyacetal according to claim 2, wherein A in general formula (4) is at least one member selected from the group consisting of $SO_3H$, $SO_3Na$, and SH.

12. An amide-group-containing polyacetal according to claim 3, wherein A in general formula (4) is at least one member selected from the group consisting of $SO_3H$, $SO_3Na$, and SH.

13. An amide-group-containing polyacetal according to claim 2, having a weight-average molecular weight of 500~500,000, wherein at least one of $R^2$ and $R^3$ in general formula (1) is at least one member selected from the group consisting of long-chain alkyl groups with 6 to 18 carbon atoms, a phenyl group, and a naphthyl group, and wherein the ratio of acetal structure unit (1) is in the range of 0.1~70 weight % of the whole amide-group-containing polyacetal.

14. An amide-group-containing polyacetal according to claim 3, having a weight-average molecular weight of 500~500,000, wherein at least one of $R^2$ and $R^3$ in general formula (1) is at least one member selected from the group consisting of long-chain alkyl groups with 6 to 18 carbon atoms, a phenyl group, and a naphthyl group, and wherein the ratio of acetal structure unit (1) is in the range of 0.1~70 weight % of the whole amide-group-containing polyacetal.

15. An amide-group-containing polyacetal according to claim 4, having a weight-average molecular weight of 500~500,000, wherein at least one of $R^2$ and $R^3$ in general formula (1) is at least one member selected from the group consisting of long-chain alkyl groups with 6 to 18 carbon atoms, a phenyl group, and a naphthyl group, and wherein the ratio of acetal structure unit (1) is in the range of 0.1~70 weight % of the whole amide-group-containing polyacetal.

16. A detergent builder, comprising the amide-group-containing polyacetal as recited in claim 2.

17. A detergent builder, comprising the amide-group-containing polyacetal as recited in claim 3.

18. A detergent builder, comprising the amide-group-containing polyacetal as recited in claim 4.

19. A detergent builder, comprising the amide-group-containing polyacetal as recited in claim 5.

20. A detergent composition, comprising a surfactant and the amide-group-containing polyacetal as recited in claim 2.

21. A detergent composition, comprising a surfactant and the amide-group-containing polyacetal as recited in claim 3.

22. A detergent composition, comprising a surfactant and the amide-group-containing polyacetal as recited in claim 4.

23. A detergent composition, comprising a surfactant and the amide-group-containing polyacetal as recited in claim 5.

* * * * *